(12) United States Patent
Lin

(10) Patent No.: US 6,383,274 B1
(45) Date of Patent: May 7, 2002

(54) INK JET INK COMPOSITIONS AND PRINTING PROCESSES

(75) Inventor: John Wei-Ping Lin, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,673

(22) Filed: Nov. 24, 1999

(51) Int. Cl.$^7$ ................................................ C09D 11/02
(52) U.S. Cl. ............................... 106/31.27; 106/31.28; 106/31.43; 106/31.58; 106/31.59; 106/31.6; 106/31.75; 106/31.86; 106/31.89
(58) Field of Search .......................... 106/31.27, 31.28, 106/31.43, 31.58, 31.59, 31.6, 31.75, 31.86, 31.89

(56) References Cited

U.S. PATENT DOCUMENTS

| | | | |
|---|---|---|---|
| 3,948,668 A | * 4/1976 | Hayek et al. | 106/31.59 |
| 4,327,174 A | 4/1982 | Von Meer | 430/530 |
| 4,985,710 A | 1/1991 | Drake et al. | 346/1.1 |
| 5,019,166 A | 5/1991 | Schwarz | 106/31.59 |
| 5,057,854 A | 10/1991 | Pond et al. | 346/140 R |
| 5,098,503 A | 3/1992 | Drake | 156/299 |
| 5,145,518 A | 9/1992 | Winnik et al. | 106/31.15 |
| 5,192,959 A | 3/1993 | Drake et al. | 346/140 R |
| 5,198,023 A | 3/1993 | Stoffel | 106/31.27 |
| 5,220,346 A | 6/1993 | Carreira et al. | 346/1.1 |
| 5,281,261 A | 1/1994 | Lin | 106/31.6 |
| 5,356,464 A | 10/1994 | Hickman et al. | 106/31.58 |
| 5,371,531 A | 12/1994 | Rezanka et al. | 347/43 |
| 5,401,303 A | 3/1995 | Stoffel et al. | 106/31.43 |
| 5,432,539 A | 7/1995 | Anderson | 347/33 |
| 5,488,402 A | 1/1996 | Shields et al. | 347/96 |
| 5,518,534 A | 5/1996 | Pearlstine et al. | 106/31.6 |
| 5,531,818 A | 7/1996 | Lin et al. | 106/31.28 |
| 5,570,118 A | 10/1996 | Rezanka et al. | 347/43 |
| 5,693,129 A | 12/1997 | Lin | 106/31.43 |
| 5,766,325 A | * 6/1998 | Gundlach et al. | 106/31.43 |
| 5,766,326 A | * 6/1998 | Gundlach et al. | 106/31.47 |
| 5,769,929 A | * 6/1998 | Gundlach et al. | 106/31.27 |
| 5,772,743 A | * 6/1998 | Gundlach et al. | 106/31.27 |
| 5,772,744 A | * 6/1998 | Gundlach et al. | 106/31.43 |
| 5,776,230 A | * 7/1998 | Gundlach et al. | 106/31.43 |
| 5,788,750 A | * 8/1998 | Gundlach et al. | 106/31.27 |
| 5,810,916 A | * 9/1998 | Gundlach et al. | 106/31.49 |
| 5,851,274 A | 12/1998 | Lin | 106/31.43 |
| 5,855,656 A | * 1/1999 | Gundlach et al. | 106/31.43 |
| 5,863,320 A | * 1/1999 | Breton et al. | 106/31.59 |
| 5,888,285 A | * 3/1999 | Gundlach et al. | 106/31.43 |
| 5,900,899 A | 5/1999 | Ichizawa et al. | 347/100 |
| 5,919,293 A | * 7/1999 | Moffatt et al. | 106/31.37 |

\* cited by examiner

*Primary Examiner*—Helene Klemanski
(74) *Attorney, Agent, or Firm*—Lahive & Cockfield, LLP

(57) ABSTRACT

The present invention relates to aqueous ink jet ink compositions comprising a water-soluble or ink-compatible anti-intercolor bleed agent and ink jet printing processes. The inks typically comprise at least water, a colorant of a dye or pigment, or a mixture of dye and pigment, and a water-soluble or ink-compatible anti-intercolor bleed agent. In one embodiment the water-compatible intercolor bleed agent of the invention comprises a fluorinated composition, more particularly a perfluoroalkyl acid salt. The water-soluble or ink-compatible anti-intercolor bleed agent can form hydrophobic layers near the image boundary, thus preventing undesired mixing of different neighboring inks which forms intercolor bleeding. The inks of the present invention exhibit reduced drying time, intercolor bleeding, and image defect as well as providing uniform ink image on transparencies.

34 Claims, No Drawings

INK JET INK COMPOSITIONS AND PRINTING PROCESSES

BACKGROUND OF THE INVENTION

The present disclosure relates to ink compositions containing an additive and printing processes. More specifically, the present invention relates to aqueous ink jet ink compositions comprising a water-soluble or ink-compatible anti-intercolor bleed agent. The inks typically comprise at least water, a colorant of a dye or a pigment or a mixture of dye and pigment, and a water-soluble or ink-compatible anti-intercolor bleed agent. In one embodiment the water-soluble or ink-compatible anti-intercolor bleed agent of the invention comprises a fluorinated composition, particularly a fluorinated organic acid salt, more particularly an organic acid salt comprising a perfluoroalkyl group. The inks of the present invention are particularly suitable for various ink jet printing processes.

Ink jet printing process is a non-impact printing method that produces droplets of ink that are deposited on a substrate such as paper or transparent film in response to an electronic digital signal. Non-impact printing methods (systems) include drop-on-demand ink jet printing and continuous-stream ink jet printing. Drop-on-demand ink jet printing systems include thermal ink jet printing processes, acoustic ink jet printing processes, and piezoelectric ink jet printing processes. Thermal or bubble jet drop-on-demand ink jet printers and piezoelectric ink jet printers have found broad application as output for personal computers in the office and in the home.

In existing thermal ink jet printing processes, the printhead typically comprises one or more ink jet ejectors, each ejector including a channel communicating with an ink supply chamber, or manifold, at one end and having an opening at the opposite end, referred to as a nozzle. A thermal energy generator, usually a resistor, is located in each of the channels, at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation of the bulging ink from the nozzle as a droplet. The acceleration of the ink out of the nozzle while the bubble is growing provides the momentum and velocity for propelling the droplet in a substantially straight line direction towards a print substrate, such as a piece of paper or transparency. Because the droplet of ink is emitted only when the resistor is actuated, this type of thermal ink jet printing is known as "drop-on-demand" printing. Other types of drop-on-demand ink jet printing include piezoelectric and acoustic ink jet printing. Several drop-on demand ink jet printing processes are described in U.S. Pat. Nos. 5,281,261, 5,693,129 and 5,851,274 the disclosures of which are totally incorporated herein by reference.

Continuous-stream ink jet printing is known to print on a substrate by placing ink droplets at desired locations while deflecting ink droplets away from the non-imaging areas. This type of ink jet printing is different from the drop-on-demand method, and is described in, e.g., U.S. Pat. Nos. 5,281,261, 5,693,129 and 5,851,274, the disclosures of which are totally incorporated herein by reference.

In an ink jet printing apparatus (or printer), the printhead typically comprises a linear array of ejectors. However, for faster ink jet printing, several printheads may be butted together to form a partial-width printhead. The printhead or partial-width printhead is moved relative to the surface of the print substrate, either by moving the print substrate relative to a stationary printhead, or vice-versa, or both. In some types of apparatus, a relatively small printhead moves across a print substrate numerous times in swathes, in order to complete a desired image. A partial image is created with each swath of the printhead movement. This type of ink jet printing is called multi-pass or checkerboard printing.

Alternatively, a printhead (e.g., a full-width array printhead or printbar comprising several butted printheads) that consists of an array of ejectors and extends the full width (or any desired length) of the print substrate may be held stationary. An ink may be deposited onto the print substrate one line at a time by the full-width array printhead (or partial-width printhead covering a portion of the width of a substrate) as the print substrate passes by, until full-page images are completed. This type of ink jet printing process uses a single pass method and it is carried out in what is usually known as a "full-width array" printer. When the full-width or partial-width array printhead and the print substrate are moved relative to each other, image-wise digital data is used to selectively activate the thermal energy generators in the printhead over time so that the desired image will be created on the print substrate. In a multi-color ink jet printing process several full-width or partial-width array printheads are used in a printer to deposit different color inks (e.g., black, cyan, magenta, and yellow inks, as well as other optionally selected inks) onto a print substrate to give full color images. In this so called "single pass method" the printheads are usually held stationary while the imaging substrate moves by (or move under) the printheads (e.g., full-width array printheads).

Aqueous inks used in ink jet printing generally have water as a major component. Water has the advantage of being non-toxic, non-combustible and environmentally sound relative to non-aqueous inks, which are largely composed of organic solvents. Water is also an excellent medium for dispersing pigments or dissolving dyes. Water is also used for bubble formation and a propellant for the ink in a thermal ink jet printing process.

In a multi-color ink jet printing process, a phenomenon known as "intercolor bleed" may occur. This effect is described in, e.g., U.S. Pat. No. 5,371,531, the disclosure of which is totally incorporated herein by reference. This phenomenon is the bleeding of one color portion of the image into another portion of the neighboring image of a different color on a substrate. This becomes most apparent especially when a black ink is imaged immediately adjacent to an area printed with a color ink such as cyan, magenta or yellow ink. In such a case, the black ink (usually a slow or medium dry ink which usually exhibits good edges for text and high optical density) will be seen to bleed into the color area or vice versa to create a conspicuous print defect which is called intercolor bleed. In some cases the black ink may generally possess high surface tension, while the color inks are generally fast dry inks with low surface tension. Intercolor bleed can take place quickly once the inks are printed onto a substrate, e.g., on plain paper or transparency before drying (e.g., before microwave or radiant heating). For example, printing a slow dry black ink immediately followed by a color ink (especially a yellow ink before the black ink can completely dry) can show undesired intercolor bleed phenomenon with poor print quality. The intercolor bleed between a black ink and a neighboring yellow ink is especially sensitive to human eyes due to high color contrast. Inter-color bleed can also occur between two different color inks (e.g., cyan and yellow inks, cyan and magenta inks, magenta and yellow inks, etc.) resulting in poor image quality.

SUMMARY OF THE INVENTION

Aspects of the present invention relate to aqueous ink jet ink compositions comprising a water-soluble or ink-compatible anti-intercolor bleed agent, and printing processes. The inks typically comprise water, a colorant of a dye or a pigment, or a mixture of dye and pigment, and a water-soluble or ink-compatible anti-intercolor bleed agent.

In one embodiment the water-soluble or ink-compatible anti-intercolor bleed agent of the present invention comprises a fluorinated composition, particularly a fluorinated acid salt composition with high fluorine content, and more particularly an organic acid salt of a metal or ammonium group comprising a perfluoroalkyl group. The water-soluble or ink-compatible anti-intercolor bleed agents of the invention comprise at least a fluorine atom and include those represented by the following formula:

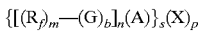   Formula (I)

wherein a) $(R_f)$ is a $C_1$ to $C_{30}$ alkyl, cyclic alkyl, alkenyl, alkynyl, or alkoxyl group and the substituents on each carbon atom are independently selected from hydrogen or fluorine;

b) (G) is a $C_6$ to $C_{10}$ alkyl group and the substituents on each carbon atom are independently selected from a hydrogen or fluorine atom; an aromatic group (e.g., phenyl $(C_6E_{(5-m)})$ or naphthyl $(C_{10}E_{(7-m)})$ group, where each E is independently selected from hydrogen or fluorine); or a $C_3$ to $C_{20}$ cyclic alkyl group (e.g., of the formula $C_T D_{(2T-1-m)}$, where each D is independently selected from hydrogen or fluorine);

c) (A) is an acid functional group, or a water compatible group (e.g., selected from ethyleneoxide, propyleneoxide, polyethyleneoxide, polypropyleneoxide and poly(ethyleneoxide-co-propyleneoxide);

d) (X) is a cation selected from: 1) monovalent metal cations, e.g., $Li^+$, $Na^+$, $K^+$, $Rb^+$, $Cs^+$, $Ag^+$, and $Fr^+$; 2) multivalent metal cations, e.g., $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, $Co^{++}$; and 3) an ammonium group of the general formula:

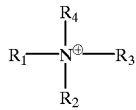   Formula (II)

wherein $R_1$, $R_2$, $R_3$, and $R_4$ are independently selected from hydrogen (e.g., $NH_4^+$, $NCH_3H_3^+$, $N(CH_3)_2H_2^+$, $N(CH_3)_3H^+$, etc.); alkyl group (e.g., methyl, ethyl, propyl, butyl, pentyl, hexyl, etc.); cyclic alkyl group (for each of $R_1$, $R_2$, $R_3$, and $R_4$, or any two of the $R_1$, $R_2$, $R_3$, and $R_4$ groups may be connected to form a cyclic ring), and hydroxyalkyl groups (e.g., hydroxyethyl, hydroxylpropyl, hydroxybutyl, etc.); or 4) alternately, a hydrogen, amine, hydroxyl, or alkoxyl group when (A) is a water compatible group, e.g., ethyleneoxide, propyleneoxide, polyethyleneoxide, polypropyleneoxide, and poly(ethyleneoxide-co-propyleneoxide; and e) m is a number in the range of about 1 to 10, b is 0 or 1, n is 1 or 2, s is 1 or 2, and p is 1 or 2.

In an embodiment, less than 8 of the carbon atoms of $R_f$ are perfluorinated. In Formula (I), the (A) and (X) are presented as groups bearing negative and positive charges respectively (shown as anions and cations respectively). This reflects the fact that some of the materials in Formula (I) can be ionized in the aqueous medium to give corresponding anions and cations. The materials in Formula (I) of this invention can also be represented in nonionic forms wherein the (A) and (X) groups do not bear negative and positive charge, respectively. For purposes of this invention, the materials in Formula (I) also include the corresponding materials in nonionic form. Although the materials in Formula (I) are presented in the ionic forms they should also be understood to include the corresponding materials in nonionic form.

In an embodiment, water-soluble or ink-compatible anti-intercolor bleed agents of Formula (I) include fluorinated organic acid salts such as fluoroalkyl acid salts, fluoro substituted cyclic alkyl acid salts, fluoroalkyl substituted cyclic alkyl acid salts, and fluoroalkyl substituted aromatic acid salts, and esters of fluorine containing acids formed with at least an alkyleneoxide moiety including polyethyleneglycol, polypropyleneglycol, and poly(ethylene-co-propylene)glycol. The aforementioned organic acid salts and esters can comprise high content of fluorine atoms in the Formula (I) (e.g., perfluoroalkyl acid salts; perfluoro substituted cyclic alkyl acid salts; perfluoroalkyl substituted cyclic alkyl acid salts, perfluoroalkyl substituted aromatic acid salts; and esters of perfluoroalkyl acids formed with at least an alkyleneoxide moiety including ethyleneglycol, propyleneglycol, polyethyleneglycol, polypropyleneglycol, and poly(ethyleneglycol-co-propyleneglycol).

The water-soluble or ink-compatible anti-intercolor bleed agents of this invention can facilitate ink drying and may form a hydrophobic layer near the image boundary adjacent to another ink (different color ink), thus preventing undesired mixing of different neighboring inks which forms intercolor bleeding. The inks of the invention exhibit reduced drying time, reduced intercolor bleed, and reduced image defect as well as providing an uniform ink image (e.g., solid area) on papers and transparencies. The ink jet inks in some cases are also believed to increase jetting frequency and to provide desired jetting performance as well as adequate drop mass to form images with high optical density and resolution (using high resolution printhead).

In addition to a water-soluble or ink-compatible anti-intercolor bleed agent, the ink jet ink composition of this invention can further comprise desired humectant and ink additives to enhance ink physical properties. The ink jet ink compositions can be used in a multi-color ink jet printing process to give high quality multi-color images on a substrate with good drying, low intercolor bleed, and without an undesired smearing problem.

The ink jet ink compositions of the present invention may optionally comprise additives such as pH buffering agents, water soluble monovalent or multivalent cationic salts for coupling with a microwave dryer and reduction of bleed, jetting aids, anti-curl agents, ink penetrants, anti-bleed agents, biocides, water soluble biocides, polymeric binders, surfactants, pigment dispersants, anti-clogging agents, anti-cockle agents, and other desired ink additives.

The ink jet inks (or ink jet ink compositions) of the present invention may suitably be prepared as black or color ink jet inks for high quality, high speed, and high resolution (such as 300 spi, 360 spi, 400 spi, 600 spi, 720 spi, 800 spi, 1200 spi, 1440 spi printheads, etc.) ink jet printing process using single, partial-width, or full-width array printheads. The present invention also provides ink jet inks which can have (1) adequate latency in a printhead especially in a high resolution printhead, (2) high frequency response with the ability for high speed ink jet printing, (3) the desired jetting performance of an ink jet ink printer, and (4) desired fast drying property and good print quality of images on a substrate, as well as multi-color images with the reduction of (i) intercolor bleed, (ii) smear, and (iii) paper curl.

In addition, the ink jet ink compositions of this invention are particularly useful for printing high quality multi-color images on a substrate in conjunction with a pigment ink (e.g., carbon black ink) in a multi-color ink jet printer. Different ink printing sequences (e.g., [Yellow (Y), Cyan (C), Magenta (M), and Black (K), YCMK]; YMCK; KMCY; KCMY; CYMK; CKMY; MKCY; MYCK; etc.) can be employed in the multi-color ink jet printing process in which the imaging substrate can be optionally heated at any stage of ink jet printing process including before, during, and after the printing as well as combinations thereof. In a particularly advantageous embodiment, a multi-color ink jet printing process employs at least one ink jet ink composition comprising an ammonium salt of Formula (I) wherein the imaging substrate is heated at any stage of ink jet printing process including before, during, and after the printing as well as combinations thereof. Heating the substrate enhances the anti-intercolor bleed properties of the inks, leading to improved image quality.

Furthermore, the ink jet ink compositions of this invention can be printed by an ink jet printing process selected from either a multiple pass method (checkerboard method) or a single pass method for desired printing speed. The use of ink jet ink compositions of this invention in a single pass method can greatly increase the capability of printing speed of an ink jet printer, particularly when the full-width array ink jet printheads are employed.

In another embodiment, the ink jet ink compositions are used in one or more high resolution printheads (resolution ≧300 spi; e.g., 360, spi, 400 spi, 600 spi, 720 spi, 1440 psi, etc.) to produce high quality images with good resolution.

DETAILED DESCRIPTION OF THE INVENTION

The present invention relates to aqueous ink jet ink compositions comprising a water-soluble or an ink-compatible anti-intercolor bleed agent. The inks typically comprise water, a colorant of a dye or a pigment, or a mixture thereof, and a water-soluble or an ink-compatible anti-intercolor bleed agent. In one embodiment the water-soluble or ink-compatible anti-intercolor bleed agent of the invention comprises a fluorinated composition, more particularly a fluorinated composition with high fluorine content, and more particularly an acid salt comprising a perfluoroalkyl group. The water-soluble or ink-compatible anti-intercolor bleed agents comprise at least a fluorine atom and include those represented by the following formula:

$$\{[(R_f)_m\text{—}(G)_b]_n(A)\}_s(X)_p \quad \text{Formula (I)}$$

wherein a) ($R_f$) is a $C_1$ to $C_{30}$ alkyl, cyclic alkyl, alkenyl, alkynyl, or alkoxyl group and the substituents on each carbon atom are independently selected from hydrogen or fluorine;

b) (G) is a $C_6$ to $C_{10}$ alkyl group and the substituents on each carbon atom are independently selected from a hydrogen or fluorine atom; an aromatic group (e.g., phenyl ($C_6E_{(5-m)}$) or naphthyl ($C_{10}E_{(7-m)}$) group, where each E is independently selected from hydrogen or fluorine); or a $C_3$ to $C_{20}$ cyclic alkyl group (e.g., of the formula $C_TD_{(2T-1-m)}$, where each D is independently selected from hydrogen or fluorine);

c) (A) is an acid functional group, or a water compatible group (e.g., selected from ethyleneoxide, propyleneoxide, polyethyleneoxide, polypropyleneoxide and poly(ethyleneoxide-co-propyleneoxide);

d) (X) is a cation selected from: 1) monovalent metal cations, e.g., $Li^+$, $Na^+$, $K^+$, $Rb^+$, $Cs^+$, $Ag^+$, and $Fr^+$; 2) multivalent metal cations, e.g., $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, $Co^{++}$; and 3) an ammonium group of the general formula:

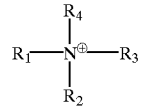

Formula (II)

wherein $R_1$, $R_2$, $R_3$, and $R_4$ are independently selected from hydrogen (e.g., $NH_4^+$, $NCH_3H_3^+$, $N(CH_3)_2H_2^+$, $N(CH_3)_3H^+$, etc.); alkyl group (e.g., methyl, ethyl, propyl, butyl, pentyl, hexyl, etc.); cyclic alkyl group (for each of $R_1$, $R_2$, $R_3$, and $R_4$, or any two of the $R_1$, $R_2$, $R_3$, and $R_4$ groups may be connected to form a cyclic ring), and hydroxyalkyl groups (e.g., hydroxyethyl, hydroxylpropyl, hydroxybutyl, etc.); or 4) alternately, a hydrogen, amine, hydroxyl, or alkoxyl group when (A) is a water compatible group, e.g., ethyleneoxide, propyleneoxide, polyethyleneoxide, polypropyleneoxide, and poly(ethyleneoxide-co-propyleneoxide; and e) m is a number in the range of about 1 to 10, b is 0 or 1, n is 1 or 2, s is 1 or 2, p is 1 or 2, and T is a number in the range of about 3 to 20.

In an embodiment, less than 8 of the carbon atoms of $R_f$ are perfluorinated. In Formula (I) (A) and (X) are presented as groups bearing negative (anions) and positive charge (cations) respectively (as shown). This reflects the fact that some of the materials in Formula (I) can be ionized in aqueous medium to give the corresponding anions and cations. The materials in Formula (I) of this invention can also be represented in nonionic forms wherein the (A) and (X) do not bear negative and positive charge respectively. For all practical purpose of this invention, the materials in Formula (I) also include the corresponding materials in nonionic forms. The materials in Formula (I) of this invention in the nonionic forms (e.g., metal or ammonium organic acid salts) can also be dispersed in ink medium without forming ionized species. The materials of nonionic forms of Formula (I) can be soluble or dispersed in ink medium comprising humectants, surfactants, ink penetrants, solvents, anti-curl agents, pigment dispersants, and other ink additives (ink-compatible anti-intercolor bleed agents). Those materials (metal or ammonium organic acid salts) of nonionic forms of Formula (I) are ink-compatible anti-intercolor bleed agents of this invention. Although the materials in Formula (I) are presented in the ionic forms they should also be understood to include the corresponding materials in nonionic forms (nonionic forms of metal or ammonium organic acid salts). For example, in the nonionic form of Formula(I) the acid group which is not represented in the ionic form (negative charge species) includes acid functional group consisting of sulfonic acid ($—SO_3$), carboxylic acid ($—CO_2$), phosphonic acid ($—HPO_3, >PO_3$) functional groups while (A) is selected from metal (e.g., Li, Na, K, Rb, Cs, Ag, Fr, Ca, Mg, Zn, Ba, Fe, Sn, Sr, Cd, Cu, Co, etc.) and ammonium ($NR_1R_2R_3R_4$) moieties without a positive charge. Other requirements remain to be the same in both ionic or nonionic forms of Formula (I).

In an embodiment, water-soluble or ink-compatible anti intercolor bleed agents of Formula (I) include fluorinated organic acid salts such as fluoroalkyl acid salts, fluoro substituted cyclic alkyl acid salts, fluoroalkyl substituted cyclic alkyl acid salts, and fluoroalkyl substituted aromatic acid salts, and esters of fluorine containing acids formed with polyethyleneglycol or polypropyleneglycol or poly (ethylene-co-propylene)glycol. The aforementioned organic acid salts and esters can comprise high fluorine content in Formula (I) (e.g., perfluoroalkyl acid salts, perfluoro substituted cyclic alkyl acid salts, perfluoroalkyl substituted cyclic alkyl acid salts, and perfluoroalkyl substituted aromatic acid salts, as well as esters of perfluoroalkyl acids formed with polyethyleneglycol or polypropyleneglycol or poly (ethyleneglycol-co-propyleneglycol)).

Examples of materials represented by Formula (I) of metal and ammonium organic acid salts (anti-intercolor bleed agents) as well as esters comprising alkyleneoxides include, but are not limited to, hexylsulfonic acid, undecafluoro-salts; heptylsulfonic acid, tridecafluoro-salts; octylsulfonic acid, pentadecafluoro-salts; nonylsulfonic acid, heptadecafluoro-salts; hexylsulfonic acid, tridecafluoro-salts; heptylsulfonic acid, pentadecafluoro-salts; octylsulfonic acid, octadecafluoro-salts; nonylsulfonic acid, nonadecafluoro-salts; perfluoro-1-octanesulfonic acid salts, perfluoro-1-nonanesulfonic acid salts, perfluoro-1-decanesulfonic acid salts, perfluoro-1-dodecanesulfonic acid salts, cyclohexanesulfonic acid, decafluoro (pentafluoroethyl)-, salts; cyclohexanesulfonic acid, nonafluorobis(trifluoromethyl)-, salts; cyclohexanesulfonic acid, decafluoro(trifluoromethyl)-, salts; perfluorocyclohexanesulfonic acid salts; hexylphenylsulfonic acid, tridecafluoro-salts; heptylphenylsulfonic acid, pentadecafluoro-salts; octylphenylsulfonic acid, heptadecafluoro-salts; nonylphenylsulfonic acid, nonadecafluoro-salts; pentafluoropropionic acid salts; perfluorobutyric acid salts; perfluoropentanoic acid salts; undecafluorohexanoic acid salts; perfluoroheptanoic acid salts; dodecafluoroheptanoic acid salts; undecafluorohexanoic acid esters of polyethyleneglycol; undecafluorohexanoic acid esters of poly(ethyleneoxide-co-propyleneoxide); undecafluorohexanoic acid esters of polypropyleneglycol; decafluorohexanoic acid salts; tridecafluoroheptanoic acid salts; didecafluoroheptanoic acid salts; pentadecafluorooctanoic acid salts; heptadecafluorononanoic acid salts; perfluoromethyldecanoic acid salts; perfluoroethyldecanoic acid salts; perfluorotetradecanoic acid salts; perfluoromethyltetradecanoic acid salts; cyclohexanecarboxylic acid, decafluoro(pentafluoroethyl)-, salts; cycloheptanecarboxylic acid, nonafluorobis(trifluoromethyl)-, salts; cyclohexanecarboxylic acid, decafluoro(trifluoromethyl)-, salts; perfluoromethylcyclohexanecarboxylic acid salts; hexyltetrafluorobenzoic acid salts; heptyltetrafluorobenzoic acid salts; perfluorohexyltetrafluorobenzoic acid salts; perfluoromethyltetrafluorobenzoic acid esters of polyethyleneglycol; hexylbenzoic acid, tridecafluoro-salts; heptylbenzoic acid, pentadecafluoro-salts; perfluoropentylbenzoic acid salts; perfluorohexylbenzoic acid salts; perfluoroheptylbenzoic acid salts; octylbenzoic acid, heptadecafluoro-salts; nonylbenzoic acid, nonadecafluoro-salts; perfluorohexylnaphthoic acid 2-(hydroxyethyl)ammonium salt; perfluoromethylnaphthoic acid salts; tridecafluorohexylnaphthoic acid salts; pentadecafluoroheptylnaphthoic acid salts; tridecafluorohexylnaphthoic acid salts; perfluorobutylnaphthoic acid salts; perfluoropropylnaphthoic acid salts; perfluorohexylnaphthoic acid salts; perfluoroheptylmethylnaphthoic acid salts; and the like as well as mixtures thereof. The aforementioned salts comprising monovalent and multivalent metal salts include, but not limited to, lithium, sodium, potassium, cesium, rubidium, francium, silver, copper, zinc magnesium, calcium, barium, cobalt, chromium, iron, strontium, and the like as well those listed in the periodic table.

The term "alkyl" refers to the saturated aliphatic groups, including straight-chain alkyl groups, branched-chain alkyl groups, cycloalkyl (cyclic alkyl) groups, alkyl substituted cycloalkyl groups, and cycloalkyl substituted alkyl groups. A straight chain or branched chain alkyl group that advantageously has about 30 or fewer carbon atoms in its backbone (e.g., $C_1-C_{30}$ for straight chain, $C_3-C_{30}$ for branched chain). Likewise, preferred cycloalkyls have from about 4 to about 12 carbon atoms in their ring structure, and more preferably have about 5 to about 10 carbon atoms in the ring structure. The term "lower alkyl" refers to alkyl groups having from about 1 to about 8 carbons in the chain, and to cycloalkyls having from about 3 to about 8 carbons in the ring structure.

Moreover, the term "alkyl" (including "lower alkyl") as used throughout the specification and claims is intended to include both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, azido, heterocyclyl, arylalkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "arylalkyl" moiety is an alkyl substituted with an aryl group (e.g., phenylmethyl (benzyl), phenylethyl, etc.).

The term "heterocyclic group" is intended to include closed ring structures in which one or more of the atoms in the ring is an element other than carbon, for example, nitrogen, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —CF₃, —CN, or the like.

The term "aromatic group" is intended to include unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —CF₃, —CN, or the like. The aromatic ring may also have more than one ring with carbon atoms of up to about 10 (e.g., napthyl, indole, carbazoyl, benzthiozyl, etc.).

The organic acid salts of the anti-intercolor bleed agents allow the materials to be ionized in water to provide the needed water compatibility in ink jet inks. The fluorinated alkyl or cyclic alkyl groups in Formula (I) are hydrophobic and capable of providing low surface tension to an ink jet ink for good wetting on a substrate and for the ink to be dried quickly soon after its printing. The fluorinated functional groups of the anti-intercolor bleed agents in an ink jet ink may also serve as a barrier on a substrate for preventing undesired ink mixing near the border areas between two printing inks. This is particularly true when one of the neighboring inks that does not have a low surface tension is printed onto a substrate next to an ink of this invention. As a result, intercolor bleed between the ink comprising the anti-intercolor bleed agent of this invention and another ink is reduced or minimized. Since the fluorinated functional groups of the anti-intercolor bleed agent in the ink are hydrophobic, they can provide additional benefit of wet smear resistance for the printed images after drying.

The organic acid salts of the anti-intercolor bleed agents allow the materials to be ionized in water to provide the needed water compatibility in ink jet inks. The $(R_f)$ or (G) groups of Formula (I) can optionally be a perfluoroalkyl or a perfluoro cyclic alkyl group or a perfluoroaromatic group or a partially fluorinated group. The water-soluble or ink-compatible anti-intercolor bleed agents of the invention may be added to ink compositions in an effective amount to prevent or reduce inter-color bleed or smear, e.g., generally in a concentration from at least about 0.1% up to about 8% by weight, preferably less than 5%, and more preferably less than 3%. In an embodiment the anti-intercolor bleed agent may be present in a concentration of up to about 5% by weight of the ink jet ink composition. In another embodiment, the anti-intercolor bleed agent may be present in a concentration of up to about 2% by weight of the ink jet ink composition.

The water-soluble or ink-compatible anti-intercolor bleed agents of this invention can provide ink jet ink compositions with low surface energy property and fast drying character and also exhibit hydrophobic or autophobic characteristics on substrates (or print substrates) for reducing inter-color bleed and smear.

In an embodiment of the invention, a first ink (e.g., a black ink such as a carbon black ink (pigment-based ink) or a dye-based black ink) comprising the water-soluble or ink-compatible anti-intercolor bleed agent can be used when it is printed on a substrate (with or without being heated) to produce sharp edge acuity next to a second ink (e.g., a fast dry color ink such as a yellow (Y), or cyan (C), or magenta (M) ink) which usually has a surface tension of less than 45 dynes/cm. Alternatively, a first ink (e.g., a dye-based or pigment-based color ink such as a yellow, magenta, cyan ink, etc.) comprising the water-soluble or ink-compatible anti-intercolor bleed agent of this invention can also be used when it is printed on a substrate next to a second ink (e.g., a black ink such as a carbon black ink or a black dye ink) with sharp edge acuity either with or without heating the substrate. The color ink (first ink) usually has a surface tension of less than 45 dyne/cm, but it can have exception.

In another embodiment of ink jet printing process of the invention, the first ink and the second ink can be selected from a group of color inks consisting of, e.g., cyan, magenta, yellow, red, blue, or green. For example, the first ink can be a yellow ink and the second ink can be a cyan ink or vice versa. The ink pair (first ink and second ink) can be selected from any two color inks in any sequence or order including, but not limiting to, Y/C, Y/M, C/M, Y/R, Y/G, C/Y, M/Y, M/C, Y/R, and the like. One of the ink jet ink compositions comprises a water-soluble or ink-compatible anti-intercolor bleed agent of this invention. In this case the intercolor bleed reduction can occur between two different color ink jet inks. The invention applies to printing any two desired ink jet inks of any color.

In a particularly advantageous embodiment, ink jet ink compositions comprising an ammonium salt of Formula (I) are used in ink jet printing process wherein the imaging substrate is heated at any stage of printing process including before, during, and after printing as well as combinations thereof. The ammonium cation may be selected from an ammonium group of the general formula:

Formula (II)

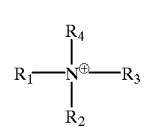

wherein $R_1$, $R_2$, $R_3$, and $R_4$ are independently selected from hydrogen (e.g., $NH_4^+$, $NCH_3H_3^+$, etc.), lower alkyl group (e.g., methyl, ethyl, propyl, butyl, pentyl, hexyl, etc.), and lower hydroxyalkyl groups (e.g., hydroxyethyl, hydroxylpropyl, hydroxybutyl, etc.). Desirably, the ammonium group comprises less than 30 carbon atoms.

Heating the substrate in the ink jet printing process (e.g., before, during, and after the printing) can enhance the anti-intercolor bleed properties of the ink, leading to improved image quality. Without wishing to be limited by theory, it is believed that ammonium salts of the water-soluble or ink-compatible anti-intercolor bleed agents can be thermally decomposed, either in the thermal ink jet printhead or on a heated print substrate, to give ammonia or amines and the corresponding acid, the latter of which has reduced water solubility or ink compatibility. The formation of the acid with reduced water solubility or ink compatibility in the ink jet printing process is believed to provide a more hydrophobic barrier for the ink near its image boundary with another ink onto a print substrate (with or without being heated), thus preventing undesired mixing of two neighboring inks to form inter-color bleed. Upon printing the ink jet ink compositions comprising a hydrophobic functional group (e.g., fluorinated $R_f$ and G groups) of Formula (I) can also provide a hydrophobic barrier onto a substrate (either with or without being heated) near the border areas of two inks, resulting in a reduction of intercolor bleed. The inks of the present invention also exhibit reduced drying time, possibly due to the hydrophobic nature of the $R_f$ and G groups, and image defects, as well as providing uniform ink image on transparencies and papers. The hydrophilic acid functional group is believed to interact or react with hydroxyl groups of a substrate (e.g., paper, fibers, etc.), while the more hydrophobic $R_f$ and G groups tend to reside on the surface of the substrate. The ink jet inks of the present invention may also have improved smear resistance and waterfastness.

In an ink jet printing process the first ink (e.g., a color ink (Cyan, Magenta, Yellow) comprising the water-soluble or ink-compatible anti-intercolor bleed agent of this invention can be printed first and form a low surface energy hydrophobic barrier on a substrate after printing. Therefore, the low surface energy hydrophobic barrier can be generated by the fluorinated materials of this invention (e.g., in the first ink) on the surface of a print substrate and prevents the undesired mixing between the first ink and the second ink (subsequently printed next to the first ink) to avoid inter-color bleed. In this case, a color ink (a first ink, e.g., any one of cyan (C), magenta (M), and yellow (Y) inks) is printed first followed by the subsequent printing of a black ink (second ink). The black ink can be a pigment-based (carbon black ink) or dye-based ink.

In another ink jet printing process, a first ink (e.g., a black ink of a dye-based or pigment-based ink) comprising the water-soluble or ink-compatible anti-intercolor bleed agent can form a low surface energy hydrophobic barrier on a substrate after it is printed. Therefore, the low surface energy hydrophobic barrier can be generated by the fluorinated materials of this invention (in the first ink) on the surface of a print substrate and prevents undesired mixing between the first ink and the second ink (e.g., a color ink such as a cyan, magenta, and yellow ink is printed subsequently) to avoid inter-color bleed. In this case, the black ink (the first ink) is printed first followed by subsequent printing of a color ink (second ink) either with or without heating the substrate.

As described earlier, the water-soluble or ink-compatible anti-intercolor bleed agents of this invention can also be employed in a color ink and used in conjunction with a black ink (black pigment ink (e.g., carbon black ink) or black dye ink) or color ink which may or may not contain the material of this invention to reduce inter-color bleed. In this case, the color ink comprising the water-soluble or ink-compatible anti-intercolor bleed agents of this invention is preferred to be printed first followed later by a dye-based or a pigment-based black ink (e.g., carbon black ink) or color ink (second ink). In a multi-color ink jet printing process the printing can be carried out in any desired ink printing sequence (or order) with optionally heated substrate provided the objective of this invention is achieved.

In an embodiment of the invention, a multiple pass printing mode (checkerboard mode) or a single pass ink jet printing process can be employed with any desired ink printing sequence (or order) to achieve a desired printing speed. For example, the ink printing sequence can be selected from a group consisting of a) K(Black), C(Cyan), M(Magenta), Y(Yellow); b) K, C, Y, M; c) K, M, C, Y; d) K, M, Y, C; e) K, Y, C, M; f) K, Y, M, C; g) Y, C, M, K; h) Y, M, C, K; i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; w) M, C, K, Y; x) M, K, Y, C; and z) M, K, C, Y; wherein one ink must comprise at least one of the water-soluble or ink-compatible anti-inter-color bleed agents to control inter-color bleed. Some of the preferred ink printing sequences include, but not limited to, cases a), c), g), and h) where the longest time intervals between printing the yellow and the black inks are possible for the reduction of inter-color bleed. The preferred ink jet printing sequence is selected also because the inter-color bleed between the black and yellow images is easier to be detected by eyes due to higher color contrast. Longest time intervals between printing the yellow and the black inks would allow one of them to be adequately dried before the next ink is deposited next to it. Thus, it minimizes possible ink diffusion between them (black and yellow inks) on a substrate for the reduction of high contrast inter-color bleed. If the inter-color bleed between two different color inks is required, then the preferred printing sequence or order can be adjusted accordingly to achieve the objective. Ink printing sequences other than the preferred cases as mentioned above can also be used. However, there is a possibility that they may be less effective in controlling inter-color bleed.

In another embodiment, each color ink (e.g., cyan, magenta, and yellow inks) in a multi-color ink jet printer can comprise any one of the desired anti-intercolor bleed agents of this invention in a favorable concentration and used to print on a substrate next to a black ink (e.g., a carbon black ink or a black dye ink) which may or may not have an anti-intercolor bleed agent of this invention. Sometimes it is preferred to print a pigment ink (carbon black ink) along with the color inks in which at least one of them comprises an anti-intercolor bleed agent of this invention in a multi-color ink jet printing process. In this case, the carbon black ink usually is preferred to be able to produce a high quality image (sharp line, text, and graphic) on substrates (plain and coated papers as well as ink jet transparency). The color inks comprising the anti-intercolor bleed agent(s) can quickly penetrate into papers and dry very fast resulting in low inter-color bleed and smear.

In another embodiment, any one of the ink jet inks (e.g., cyan, magenta, yellow, etc.) in a multi-color ink jet printing process can comprise the water-soluble or ink-compatible anti-intercolor bleed agent of this invention. If necessary, more than one ink or all inks (e.g., black and color inks) can also comprise the water-soluble or ink-compatible anti-intercolor bleed agents in the ink jet ink compositions to reduce intercolor bleeding or drying problem. In an alternate embodiment, a multi-color ink jet printing process of the invention may employ at least one ink jet ink composition of Formula (I) having a latency of $\geq 10$ sec. when the ink is printed with a printhead with a resolution of $\geq 600$ spi.

The above multi-color ink jet printing processes which use the inks of the present invention can be carried out either with or without heating the substrate during the ink jet printing. The substrate can be heated at any stage of ink jet printing including before, during, or after the printing as well as combinations thereof. Conventional heating methods such as radiant heating, lamp or light heating, microwave heating, heated platen, heated drum, heated belt, hot air, and heated roller can be employed. Heating the substrate during printing can be particularly useful for producing high quality images with very low or no intercolor bleeding, especially when the ammonium salts of the water-soluble or ink-compatible anti-intercolor bleed agents of the invention are used.

The water-soluble or ink-compatible anti-intercolor bleed agents can also be used to help ink drying and the formation of uniform image on papers or transparencies without mottle. Furthermore, it can also help producing good ink jet images on transparencies which can be difficult to obtain. Ink jet ink compositions of the invention can also provide long latency, high frequency response, and smooth jetting when a high resolution (e.g., $\geq 300$ spi, 400 spi, 600 spi, 720 spi, 1440 spi, etc.) ink jet printhead is used.

Ink jet ink compositions of the present invention may also optionally include any of the various known water miscible or soluble organic compounds such as humectants or co-solvents. Suitable organic compounds (humectants or co-solvents) include, but are not limited to, glycol derivatives such as ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, polypropylene glycol, and the like; diols including 1,3-propanediol, 1,4-butanediol, 1,5-pentanediol, and 1,6-hexanediol; triols including glycerine, trimethylolpropane, 1,3,5-pentanetriols, 1,3,5-hexanetriols, 1,2,5-pentanetriols and 1,2,5-hexanetriols; reaction products of all aforementioned glycols, diols, and triols with alkylethyleneoxides such as ethyleneoxide and propyleneoxide, and mixtures thereof; sulfoxides (dimethylsulfoxide, methylethylsulfoxide, diethylsulfoxide, and the like); sulfones including sulfolane, dimethylsulfone, methylsulfone and the like; amides including 2-pyrrolidinone, N-methylpyrrolidinone, N,N-dimethylformamide, N-methylacetamide, N,N-dimethylacetamide, caprolactam, and the like; hydroxyamides including N-acetylethanolamine, N-acetylpropanolamine, N-hydroxyethylpyrrolidinone and the like; urea and its derivatives(ureas); inner salts including betaines; glycol ethers including carbitol derivatives such as butylcarbitol, cellusolve, and the like; polyglycolether derivatives; alcohols including octanol, heptanol, n-hexanol, n-petanol, n-butanol, n-propanol, isopropanol, ethanol, methanol, and the like; thio derivatives of the aforementioned hydroxyl containing compounds; amino alcohol derivatives; derivatives and isomers of the aforementioned materials; and their mixtures thereof. Many other known humectants in the art of ink jet inks can also be employed.

The ink jet inks of the present invention with a surface tension in the range of 25–72 dyne/cm include both fast drying and slow drying inks. The slow drying inks generally have a surface tension which is equal to or greater than 45 dynes/cm, while fast drying inks generally have a surface tension less than 45 dynes/cm. The slow drying inks tend to give good edges and sharp images on plain papers with a slow printing speed. The fast drying inks are capable of printing at a fast speed but with a slightly inferior print quality. Fast drying inks can comprise a penetrant that will increase ink drying speed. The penetrant gives the fast drying ink a lower surface tension, usually less than about 45 dynes/cm and preferably less than about 40 dynes/cm. Preferably, the fast drying ink jet inks have a surface tension of from about 22 to about 45 dynes/cm, and more preferably from about 22 to about 40 dynes/cm. The inks comprising the water-soluble or ink-compatible anti-intercolor bleed agents of this invention can also be used as a penetrant to provide a desired ink surface tension for ink drying (e.g., a low surface tension). The viscosity of the inks at 25° C. is usually less than about 20 cps (centipoises), preferably from about 1 cp to about 10 cps, and more preferably from about 1 cp to about 5 cps.

Penetrants suitable for use in the present invention include, but are not limited to, hydroxyether derivatives, including alkylcellusolves, propyleneglycol butyl ether, dipropyleneglycol butyl ether, tripropyleneglycol methyl ether, and the like, and alkylcarbitols such as hexylcarbitol, pentylcarbitol, butylcarbitol, and the like, polyethyleneglycol ether derivatives (e.g., one or two hydroxyl group(s) of polyethyleneglycol is replaced by a functional group such as methyl, ethyl, propyl, butyl, pentyl, hexyl, dodecyl, lauryl, stearyl, phenyl, alyklphenyl (e.g., octylphenyl, nonylphenyl, and the like)); and polypropyleneglycol ether derivatives (e.g., one or two hydroxyl group(s) of polypropyleneglycol is or are replaced by a functional group such as methyl, ethyl, propyl, butyl, pentyl, hexyl, dodecyl, lauryl, stearyl, phenyl, and alyklphenyl); alcohol derivatives (e.g., methanol, ethanol, isopropanol, pantanol, hexanol, octanol, and the like as well as their isomers); alkyl and cyclic amide derivatives including hexanoic acid amide, octanoic acid amide, N-cyclohexylpyrrolidinone, N-hexylpyrrolidinone, N-ethylpyrrolidinone, N-pentylpyrrolidinone, and the like; various surfactants having hydrophobic and hydrophilic moieties in the molecule including nonionic, cationic, and anionic types surfactants; and mixtures thereof.

The ink jet ink compositions of the present invention comprise a colorant. The colorant can be selected from any of the suitable colorants known in the art and preferably a dye or a pigment, or a mixture of dye and pigment. The pigment may or may not comprise a pigment dispersing agent. For example, chemically modified pigments that have water compatible or ionized functional group(s) on the pigment particle surface such as anionic carboxylate, phosponate, and sulfonate group(s) as well as cationic ammonium group(s) can be dispersed in aqueous inks without a pigment dispersing agent. If it is desired, like the chemically unmodified pigments, the chemically modified pigments can also be used in conjunction with a pigment dispersant. An example of the chemically pigments was disclosed in U.S. Pat. No. 5,281,261 by Lin, the disclosure of which is totally incorporated herein for reference. Some commercially available pigment dispersions that comprise chemically modified pigments include, but not limited to, Cab-O-Jet® carbon black dispersions from Cabot Chemical Co. and Bonjet® carbon black dispersions from Orient Chemical Co. of Japan. Those chemically modified pigment dispersions comprising either anionic or cationic group(s) can be employed in ink jet ink compositions of the present invention. For example, the anionic groups consisting of sulfonic acid salts, carboxylic acid salts, and phosphonic acid salts can be attached to the surfaces of the pigment particles by a special chemical modification method. In addition, the colorant may, in embodiments, be a mixture of one or more pigments and/or dyes. The color of the mixed pigments and/or dyes can be used to provide desired color gamut and hue of ink jet images.

In embodiments where dyes are used, the dye is present in the ink jet ink in any effective amount to provide a desired color. The dyes can be selected from cationic, anionic, reactive, direct, acid and basic dyes. Typically the dye (solid dye content) is present in an amount of from about 0 to about 15% by weight of total ink weight, and preferably from about 0.1 to about 10% by weight of total ink weight, although the amount can be outside this range. If a dye solution (a solution containing dye(s)) is used in ink formulations then higher weight percentage of dye solution is needed in order to provide required amount of solid dye content. A mixture of dyes in the different proportions can be employed to obtain a desired shade or hue. Similarly, in embodiments where pigments are used, the pigment may be present in the ink jet ink in any effective amount to provide needed color strength. Typically the pigment (solid pigment content) is present in an amount of from about 0 to about 15% by weight of total ink weight and preferably from about 0.1 to about 10% by weight of total ink weight, and more preferably from 1 to 8 percent by weight of total ink weight, although the amount can be outside of this range. Where both dyes and pigments are incorporated into the ink jet ink composition, the weight percentage of the combined colorant may be adjusted accordingly.

The ink compositions of the present invention can comprise a colorant such as water soluble or dispersible dyes including anionic and cationic dyes. Those dyes can be Basic, Acid, Direct, Cationic, Anionic, and Reactive dyes. Examples of suitable dyes include, but are not limited to, Food dyes such as Black No. 1, Food Black No. 2, Food Red No. 40, Food Blue No. 1, Food Yellow No. 7, and the like; FD & C dyes; Acid Black dyes (Nos. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like); Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 227, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes; azo dyes such as monoazo dyes and diazo dyes; phthalocyanine derivatives, including various phthalocyanine metal sulfonate salts and phthalocyanine ammoniumsulfonate salts, metal phthalocyanine salts, and the like; aza annulenes; formazan copper complexes; triphenodioxazines; Bernacid Red 2BMN; Pontamine Brilliant Bond Blue A; Pontamine; Cibracron Brilliant Red 38-A (Reactive Red 4), available from Aldrich Chemical; Drimarene Brilliant Red X-2B (Reactive Red 56) available from Pylam, Inc.; Levafix Brilliant Red E4B, available from Mobay Chemical; Levafix Brilliant Red E-6BA, available from Mobay Chemical; Procion Red H8B (Reactive Red 31), available from ICI America; Direct Brilliant Pink B Ground Crude, available from Crompton & Knowles; Cartasol Yellow GTF Presscake, available from Sandoz, Inc.; Cartasol Yellow GTF Liquid Special 110, available from Sandoz, Inc.; Yellow Shade 16948, available from Tricon; Basacid Black X34 (BASF X-34), available from BASF; Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; various Reactive dyes, including Reactive Black dyes, Reactive Blue dyes, Reactive Red dyes including Reactive red 180, and the like, and Reactive Yellow dyes including Reactive yellow 37; as well as mixtures thereof.

The pigments can be black, cyan, magenta, yellow, red, blue, green, brown, and the like, as well as mixtures thereof. Examples of suitable pigments include, but are not limited to, various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series, and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® (Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen® Green L8730 (BASF), Argyle Green XP-111-S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2GO1 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal® Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol® Rubine Toner (Paul Uhlich), Lithol® Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen® Red 3340 (BASF), and Lithol® Fast Scarlet L4300 (BASF). Other useful pigments can also be selected. The pigments of the present invention may be stabilized in ink jet compositions by employing a pigment dispersant which can be selected from anionic, cationic, and nonionic pigment dispersants, as well as mixtures thereof (except mixtures of anionic and cationic dispersants). The pigments of the present invention may also be chemically modified or stabilized by their attached functional groups on the surface of pigment particles such as carboxylic acid salts, sulfonic acid salts, and phosphonic acid salts as well as substituted or unsubstituted ammonium salts. Those functional groups of the chemically modified pigment particles can be ionized in an aqueous medium to provide ink stability either with or without the presence of an additional pigment dispersant.

The preferred pigments for the ink jet inks of the present invention are nontoxic and AMES test (a mutagenic test) negative materials that include nonmutagenic and noncarcinogenic pigments for safety reasons. For example, it is often desirable to have dyes and pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 part per million and, therefore, the inks derived from such pigments are generally considered to be toxic or failing to pass the AMES test. However, many nontoxic carbon blacks and color pigments including Raven® 5250, Raven® 5750, Regal® 330, Black Pearl® 1300, Black Pearls L, Vulcan® XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 1 part per million. They do not show positive response in the AMES test and are considered to be safe in toner and ink jet ink applications.

Preferably, the pigment particle size is as small as possible to enable a stable colloidal suspension of the particles in the liquid vehicle with good color strength and to prevent clogging of the ink channels or nozzle openings when the ink is used in a thermal ink jet printer. Preferred particle average diameters are generally from about 0.001 to about 10 μm, although the particle size can be outside these ranges in embodiments. A preferred average pigment particle size in the inks of the present invention includes particles having at least 50% of the particles being below 0.3 μm with no remaining particles being greater than 3.0 μm (measured by a Particle Size Analyzer). More preferably, the average pigment particle size includes particles having at least 50% of the particles being below 0.3 μm with no remaining particles being greater than 1.0–1.2 μm.

In embodiments of the present invention, the pigment may be dispersed in the ink with one or more dispersants. The dispersants can be anionic, cationic, and nonionic types. Some preferred dispersants are ionic dispersants that have both ionic (capable of ionization in water) and hydrophobic (affinity for pigments) moieties. Suitable dispersants include, but are not limited to, including polymers and copolymers of styrene sulfonate salts (such as $Na^+$, $Li^+$, $K^{++}$, $Cs^+$, $Rb^+$, substituted and unsubstituted ammonium cations, and the like) and naphthalene sulfonate salts, (such as $Na^+$, $Li^+$, $K^+$, $Cs^+$, $Rb^+$, substituted and unsubstituted ammonium cations, and the like); copolymers of unsubstituted and substituted (e.g., alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) and an aldehyde derivative (such as alkyl aldehyde derivatives including formaldehyde, acetaldehyde, propylaldehyde, and the like), and mixtures thereof. They can be added to an ink either in solid form or water solutions. Examples of such dispersants include commercial products such as Versa® 4, Versa® 7, Versa® 77 (National Starch and Chemical Co.); Lomar® D (Diamond Shamrock Chemicals Co.); Daxad® 19, Daxad® K (W. R. Grace & Co.); Tamol® SN (Rohm & Haas); and the like. Some of the preferred dispersants comprise naphthalene sulfonate salts, especially a condensation or reaction products of naphthalenesulfonic acid and formaldehyde, and its salts (such as $Na^+$, $Li^+$, $K^+$, $Cs^+$, $Rb^+$, substituted and unsubstituted ammonium cations, and the like) as well as polymers and copolymers comprising various carboxylic salts. Also, nonionic dispersants or surfactants can be used in ink jet inks of the present invention, such as ethoxylated monoalkyl or dialkyl phenols including Igepal® CA and CO series materials (Rhone-Poulenc Co.); and Triton® series materials (Union Carbide Company). These nonionic surfactants or dispersants can be used alone or in combination with the aforementioned anionic or cationic dispersants.

Useful cationic dispersants of the present invention generally comprise substituted and unsubstituted ammonium salts.

The ink jet inks of the present invention may optionally comprise a water soluble or miscible microwave coupler which can be ionic or nonionic type. The nonionic type may include, but not limited to, various alcohol derivatives, hydroxyamide derivatives, and their oxyalkylene reaction products which can be used in ink jet inks to couple with the microwave dryer for effective drying of images on papers and the reduction of smear and inter-color bleed.

Those hydroxyamide derivatives and their condensation products with alkyleneoxides (oxyalkylenes) can function as humectants, anti-curl agents, and/or microwave couplers. They can be used in ink jet inks either with or without an ionic type microwave coupler.

The ionic type microwave coupler can be selected from an organic or inorganic salt that allows an ink to be dried quickly by a microwave heating device. The microwave coupler can be, for example, a salt that provides the ink jet ink with a desirable conductivity and coupling efficiency. The salts or ionic compounds exhibit a high degree of ionization in aqueous inks with good electrical conductivity and are capable of coupling with a heating device such as a microwave device. These ionic compounds typically include metal and ammonium salts of inorganic acids with cations and anions. Typical cations of salts include, but are not limited to, $H^+$, $NH_4$, $Cs^+$, $K^+$, $Na^+$, $Li^+$, $Ca^{+2}$, $Mg^{+2}$, $Zn^{+2}$, $Ni^{+2}$, $Mn^{+2}$, $Co^{+2}$, $Sr^{+2}$, $Cd^{+2}$, $Ba^{+2}$, $Fe^{+2}$, $Cu^{+2}$, $Ga^{+3}$, $In^{+3}$, $Cr^{+3}$, $Pr^{+3}$, $Nd^{+3}$, $Y^{+3}$, $Al^{+3}$, $Fe^{+3}$, lanthanide cations, actinide The anions of those salts include, but are not limited to, inorganic anions such as $I^-$, $Br^-$, $Cl^-$, $F^-$, $OH^-$, $NO_3^-$, $SO_4^{2-}$, various ethylenediaminetetraacetic acid (EDTA) anions, and the like. salts of monovalent and multivalent salts can also be used in ink jet inks for reduction of intercolor bleeding (bleed near the border of two different inks) either through microwave heating of the images or chemical interaction with anionic type colorants (e.g., anionic dyes, pigments stabilized with anionic dispersants, pigments with an anionic functional group on the surface, and the like) in a multi-color ink jet printing process.

The use of those salts are desirable when they are compatible with optional ink components of the present invention including water, hydroxyamide derivatives, sulfur-containing humectants such as sulfoxides and sulfones, or other humectants including glycol derivatives, polyethyleneglycols, polypropyleneglycols, and the like, colorants including dyes and pigments, and other ink additives. They are chosen so that they will not cause a latency or a jetting problem, especially for a high resolution printhead. In embodiments of the present invention, the salts of inorganic and organic acids with ionizable cations and anions in aqueous inks can be included in the ink jet inks in an amount of from about 0 to about 10% by weight of total ink weight, and preferably in an amount of from about 0 to about 5% by weight of total ink weight, although they can be outside this range.

The ink jet inks of the present invention may optionally include a jetting aid such as polyethyleneoxide. A preferred polyethyleneoxide is one having a weight-average molecular weight of about 18,500 at a concentration of about 0.001–1.0% by weight of inks, and preferably a concentration of less than 0.6% by weight. The jetting aid provides smooth jetting or jetting with low jitters.

Other desired chemical additives including surfactants, water soluble polymers, pH buffers, biocides, chelating agents (EDTA and the like), and other known additives can also be optionally used in inks of the present invention.

Such additives can generally be added to ink jet inks of the present invention in known amounts for their known purpose.

Surfactants or wetting agents can be added to the ink to control ink wetting and surface tension. These additives may be of the anionic or cationic or nonionic types. Suitable surfactants and wetting agents include, but are not limited to, those of Tamol SN®, Tamol LG®, and Triton® series (Rohm and Hass Co.); those of the Marasperse® series; those of the Igepal® series (Rhone-Poulenc Co., formerly from GAF Co.); those of the Brij® Series (ICI America Inc.) including Brij® 30, Brij® 35, Brij®52, Brij® 56, Brij® 58, Brij® 72, Brij® 76, Brij® 78, Brij® 92, Brij®96, and Brij® 98; those of Surfynol® Series (Air Product Co.); those of the Tergitol® series (Union Carbide Co.); those of the Duponol® series (E.I. Du Pont de Nemours & Co.); sodium lauryl sulfate; sodium dodecyl sulfate; sodium octyl sulfate; Emulphor® ON 870 and ON 877 (GAF); Igepal® Series (Rhone-Poulenc Co.) surfactants including Igepal® CO-630, Igepal® CO-530, Igepal® CA-630, and Igepal® CA-530; and the like; and other commercially available surfactants. These surfactants and wetting agents may be present in the ink jet inks in effective amounts, generally from about 0 to about 8 percent by weight of total ink weight, and preferably from about 0 to about 6 percent by weight of total ink weight, and more preferably from about 0 to about 4 percent by weight of total ink weight, although the amount can be outside these ranges.

Polymeric chemical additives can also be added to the ink jet inks of the present invention to enhance the viscosity of the ink. Suitable polymeric additives include, but are not limited to, water soluble polymers such as Gum Arabic, hydroxypropylcellulose, hydroxyethylcellulose, polyvinylpyrrolidinone, polyvinylether, starch, polysaccharides, polyethyleneimines being derivatized with ethylene oxide and propylene oxide, such as the Discole® series (DKS International); the Jeffamine® series (Texaco); and the like. Polymeric additives may be present in the ink jet inks of the present invention in amounts of from about 0 to about 10 percent by weight of total ink weight, preferably from about 0.001 to about 8 percent by weight of total ink weight, and more preferably from about 0.01 to about 4 percent by weight of total ink weight, although the amount can be outside these ranges.

Other optional additives for the ink jet inks of the present invention include biocides such as Dowicil 150, 200, and 75, benzoate salts, sorbate salts, Proxcel® (available from ICI), and the like. When used in inks, such biocides are generally present in an amount of from 0 to about 10 percent by weight of total ink weight, preferably from about 0.001 to about 8 percent by weight of total ink weight, and more preferably from about 0.01 to about 4.0 percent by weight of total ink weight, although the amount can be outside these ranges.

Ink jet inks of the present invention may also include pH controlling agents or pH buffering agents. Suitable pH controlling agents include, but are not limited to, acids, bases, phosphate salts, carboxylate salts, inner salts with cation and anion in a molecule, sulfite salts, amine salts, and the like. When used in inks, such pH controlling agents are generally present in an amount of from 0 to about 10 percent by weight of total ink weight, preferably from about 0.001 to about 5 percent by weight of total ink weight, and more preferably from about 0.01 to about 5 percent by weight of total ink weight, although the amount can be outside these ranges.

Other suitable chemical additives are chelating agents including EDTA (ethylene diamine tetraacetic acid), HEEDTA N-(hydroxyethyl)ethylenediaminetetracetate), NTA (nitrolacetate), DTPA (diethylenetriaminepentaacetic acid), and the like, as well as their salts, typically present in an amount of from 0.001 to about 10 percent by weight of total ink weight and preferably from 0.001 to 5 percent by weight of total ink weight, although the amount can be outside of these ranges.

The ink jet inks of the present invention possess good jetting performance (e.g., long latency, etc.) and frequency response when a high resolution printhead (e.g., $\geq 360$ spi) such as a 600 spi printhead is employed. This would allow an ink jet ink to be jetted easily and requires less frequent ink spitting or printhead maintenance for the production of high-resolution images. A multi-color ink jet printing process in accordance with the invention may employ at least one ink jet ink composition of Formula (I) having a frequency response of up to 12 kHz when a printhead with a resolution of $\geq 600$ spi is used.

In addition, the ink jet inks of the present invention can have excellent long-term jetting stability (e.g, jetting greater than $1 \times 10^7$ drops), thus, allowing the printhead or printbars to be used for a long period of time. This reduces the cost of ink jet printing operation and maintenance. The use of ink jet inks of the present invention also provides the capability of a fast speed ink jet printing (e.g., 50 pages per minute for multi-color ink jet printing) especially when partial-width or full-width array printheads are employed. The capability of fast speed multi-color ink jet printing of the present invention far exceeds that of the current state-of-the-art commercial multi-color ink jet printers.

The ink jet printing of the inks of the present invention can be carried out in a checkerboard or image-wise single pass method (ink jet printing process).

Some ink jet printers such as desk-top printers employ mobile printhead(s). A mobile printhead typically comprises a plurality of closely arranged nozzles provided in a small printing area. Such a mobile printhead produces partial digital images (e.g., checkerboard printing method), which when combined form large recognizable images, by sliding along a guide and dispersing ink during each "pass" across a print substrate.

This type of ink jet printer usually is a slow speed desk top ink jet printer that is available in the current market. The mobile printhead may also comprise two or more butted printheads (i.e., a partial-width printhead with increasing number of ink nozzles comprising, e.g., more than 384 nozzles per printhead) such as the one employed in a partial-width array ink jet printer so that more ink can be delivered to a substrate in a single swath as it moves across the print substrate. This type of partial-width ink jet printer will have a higher ink jet printing speed as compared to the aforementioned desk top ink jet printer with a single printhead per ink cartridge. In a multi-color ink jet printing process, several printheads (e.g., black, cyan, magenta, and yellow) and their corresponding inks can be mounted on a printhead holder and moved across the print substrate. Different color inks are dispersed onto a print substrate when they are moved relative to the print substrate or vice versa.

Multi-color ink jet image can be obtained by repeated printing. Multi-color ink jet printing process using the partial-width printheads (e.g., black, cyan, magenta, and yellow printheads with their corresponding inks) increases the printing speed of the checkerboard printing process.

Other faster ink jet printing such as a single pass ink jet printing or full-width array ink jet printing employs a full-width array printhead comprising a plurality of closely arranged nozzles and ejectors arranged across a width of a print substrate (an array of butted printheads extended to the width of a print substrate; for example, it can comprise more than several thousand ink jet nozzles per printhead. These nozzles can disperse ink without several time consuming passes of the printhead across the print substrate. The full-width array ink jet printheads are usually stationary in the printing process while the print substrate is passing through the printheads. Many known full-with array ink jet printheads, processes, and their applications are described in U.S. Pat. Nos. 5,057,854; 4,985,710; 5,098,503; 5,192,959; and 5,432,539; the entire disclosures of which are incorporated herein by reference. In a multi-color ink jet printing process several full-width array printheads (e.g., black, cyan, magenta, yellow, etc.) can be employed for printing inks onto a substrate. The ink jet inks of the present invention can be employed in conjunction with a heater or dryer (e.g., a microwave dryer or radiant heating device) to perform ink jet printing at a high speed (e.g., equal to or less than 50 pages per minutes) to produce high quality multi-color images on plain or coated papers without smear or inadequate drying.

In another embodiment of the present invention, the print substrate used for printing the inks of the present invention in an ink jet printing process can be optionally heated at any stage of printing process including before, during, and after printing as well as combinations thereof. The print substrate and inks can be optionally heated by various devices or means including, but not limited to, radiant heater, electric resistor, heating tape, hot plate, hot roller, microwave device, heated platen, radiation including heated lamp and desired light sources, and hot air as well as combinations thereof. In the multi-color ink jet printing process of the present invention which involves a set of at least four inks (e.g., comprising black, cyan, magenta, and yellow inks), the image of the first printing ink (e.g., black ink, or yellow ink, or magenta ink, or cyan ink) can be dried on the surface of the print substrate before the deposition of other inks near the border of the first ink. Alternatively, printing can be carried out by different inks and optionally heated by a heating device at any stage of printing process including before, during, and after printing as well as combinations thereof. The ink jet inks can be dried quickly by a heater (e.g., a microwave dryer, radiant heater, heated platen, heated roller, heated belt, etc.) to give excellent multi-color images without undesired smear or inter-color bleed.

The ink jet inks of the present invention may be applied to a suitable print substrate in an image-wise fashion (e.g., using full-width array printheads). Application of the ink of the present invention to the print substrate can be made by any suitable ink jet printing process compatible with the ink jet inks, such as continuous stream ink jet printing, drop-on-demand ink jet printing (including piezoelectric, acoustic, and thermal ink jet printing processes), and the like.

The print substrate employed in the present invention can be any substrate compatible with aqueous-based inks, including, but not limited to, plain papers, such as Xerox® series 10, Xerox® 4024, Japanese papers, HP Bright White, office papers, Recycled Bond paper, Domtar, Comwall-Ontario, Xerox Image Series LX, Hammermill Tidal DP, International Paper Selma, Al., Xerox 4024 DP, Rank Xerox, Premier ECF, Rank Xerox Premier TCF, Champion Brazil paper, Rank Xerox Business, Aussedat-Rey, Rank Xerox Exclusive, Rank Xerox Premier TCF, Nymolla, Xerox 4024, Cascade Xerographic paper, Spectrum DP, Husky Xerocopy, Xerox Image Elite, Fuji Xerox Paper, ink jet papers, commercial bond papers, and the like; coated papers (or special ink jet papers), such as those available from Hewlett-Packard, Canon, Oji Paper Co., and Xerox Corporation; and ink jet transparency materials suitable for aqueous inks or ink jet printing processes including those from Artright Co., Hewlett-Packard, Asahi Glass Co., Canon Co., and Xerox Corporation. Textile and other substrates can also be used as a print substrate if it is desired.

Aqueous ink jet inks of the present invention provide numerous benefits including low printing cost, high image resolution, excellent print quality on a variety of substrates, excellent jetting capability with good drop velocity, long latency, good drop mass or drop volume that provide optimal optical density, high frequency response to allow for high speed and high resolution ink jet printing, good printhead recoverability and maintainability, excellent ink jetting stability, and no undesired printhead kogation.

The ink jet inks of the present invention can dry very fast to avoid inter-color bleed on plain papers either with or without a heating device. The ink jet inks also can have reduced curl property. In addition, the ink jet inks can be jetted at high speed with partial-width ink jet printhead or full-width array ink jet printheads or printbars to give black or multi-color images at a speed of up to 50 pages per minute.

Specific embodiments of the present invention will now be described in detail. These Examples are intended to be illustrative only, and the invention is not limited to the materials, conditions or process parameters set forth in these embodiments. All parts and percentages are by weight in inks, unless otherwise indicated. Other embodiments and modifications of the present invention may occur to those skilled in the art subsequent to a review of the information presented herein; these embodiments and modifications, as well as equivalents thereof, are also included within the scope of the present invention.

EXAMPLE 1

A black ink comprising 17% North America NBX-34 dye solution (BASF Corporation), 3% Direct Red 227 solution (Sodium salt), 20% sulfolane (95%, Phillips Petroleum Co.), 6% Trimethylopropane (TPM, Aldrich Chemical Co.), 0.05% polyethyleneoxide (Average MW≈18500), 0.05% Dowicil 200 (Dow Chemical Co.), 1.25% ammonium formate, and water for balance was prepared and filtered through a 1.2 micron membrane filter. The B1 black ink was used as a reference or control for comparison. The ink has a surface tension of 52 dyne/cm at room temperature.

EXAMPLE 2

The B1 black ink (135.92 g) was modified by thorough mixing with a fluorinated surfactant [0.135 g of Fluorad FC-98 from 3M Co., a mixture of 1) Cyclohexanesulfonic acid, decafluoro(pentafluoroethyl)-, potassium salt 66–70% (CAS Registry No. 67584-42-3), 2) Cyclohexanesulfonic acid, nonafluorobis (trifluoromethyl)-, potassium salt 9–13% (CAS Registry No. 68156-01-4), 3) Cyclohexanesulfonic acid, decafluoro(trifluoromethyl)-, potassium salt 18–22%, CAS Registry No.68156-07-0), and a derivative of Potassium perfluorocyclohexyl sulfonate 1–3% (CAS Registry No. 3107-18-4)] and filtered through 1.2 micron and 0.8 micron membrane filters. This modified black ink (B2) has about 0.1% surfactant and a surface tension of about 32.5 dyne/cm. The B2 black ink dries faster than the B1 black ink control.

EXAMPLE 3

A yellow ink was prepared comprising 27% PROJET Yellow (Zeneca, 7.5% solution), 20% Acid Yellow 17 (10% solution), 12% butylcarbitol, 15.75% sulfolane, 13.0% N-acetylethanolamine, 0.05% polyethyleneoxide, 0.05% Dowicil, 2% ammonium bromide, 0.03% ammonium hydroxide, and water for balance. This yellow ink was used as a reference or control and designated as Y1.

EXAMPLE 4

A black ink comprising 17% North America NBX-34 dye solution (BASF Corporation), 3% Direct Red 227 solution (Sodium salt), 20% sulfolane (95%, Phillips Petroleum Co.), 12% Butylcarbitol, 15% sulfolane (95%, Phillips Petroleum Co.), 13% N-acetylethanolamine, 2% Ammonium Bromide, 0.05% polyethyleneoxide (Average MW≈18500), 0.05% Dowicil 200 (Dow Chemical Co.), 0.1% of Fluorad FC-98 from 3M Co., [comprising a mixture of 1) cyclohexane-sulfonic acid, decafluoro(pentafluoroethyl)-, potassium salt 66–70% (CAS Registry No. 67584-42-3), 2) Cyclohexane-sulfonic acid, nonafluorobis(trifluoromethyl)-, potassium salt 9–13% (CAS Registry No. 68156-01-4), 3) Cyclohexanesulfonic acid, decafluoro(trifluoromethyl)-, potassium salt 18–22%, CAS Registry No.68156-07-0), and a derivative of Potassium perfluorocyclohexyl sulfonate 1–3% (CAS Registry No. 3107-18-4)], and water for balance was prepared and filtered through 1.2 micron and 0.8 micron membrane filters. This black ink (B3) is a fast dry ink and has a surface tension of about 32 dyne/cm at room temperature and dries faster than the B1 black ink.

EXAMPLE 5

The control black ink (B1) was printed next to the yellow ink (Y1) on various plain papers (16 papers) using Xerox 600 spi high resolution thermal ink jet printheads and software for printing line imaging patterns designed for studying inter-color bleed (ICB). The ink jet printing was carried out by printing the black ink (K) first followed by the yellow ink (Y) in a single pass ink jet printing process using stationary printheads so the print substrates move through the printheads at a fast speed (>15 pages per minute). The printing sequence is KY sequence. The image was subsequently dried by a microwave device after printing. The Midrange Frequency Line Edge Noise (MFLEN), which is a way for evaluation of line edge sharpness, was employed to evaluate line sharpness in the border area between two ink images (e.g., black ink next to yellow ink). The lower MFLEN number represents a sharper line with lower inter-color bleed. MFLEN data were obtained by using a light source, a focused and calibrated camera equipped with an electronic sensor, a neutral filter, and proper software. The plain papers used for the ICB study in the present invention comprise 1) Recycled Bond paper, Domtar, Cornwall-Ontario, 2) Xerox Image Series LX, 3) Hammermill Tidal DP, International Paper Selma, Al., 4) Xerox 4024 DP, 5) Rank Xerox, Premier ECF, 6) Rank Xerox Premier TCF, 7) Champion Brazil, 8) Rank Xerox Business, Aussedat-Rey, 9) Rank Xerox Exclusive, 10) Rank Xerox Premier TCF, Nymolla, 11) Xerox 4024, 12) Cascade Xerographic paper, 13) Spectrum DP, 14) Husky Xerocopy, 15) Xerox Image Elite, and 16) Fuji Xerox Paper. Lower average inter-color bleed MFLEN value indicates better print quality. The average inter-color bleed MFLEN data for the aforementioned papers (16 papers) using the ink pair B1/Y1 is 59.7 (KY sequence, data of the reference or control ink pair ). The jetting frequency for this ink is up to 10 KHz (see Example 6 for more information). For comparison purposes the data for ink jet ink of the present invention are shown below in Example 6.

EXAMPLE 6

The printing experiment was also carried out for B2 black ink and Y1 yellow ink using the same procedure described in Example 5. Again the experiment was done using 600 spi printheads and single pass ink jet printing process (stationary printheads and print substrates move through the printheads) at a fast speed (>15 pages per minute). The same papers in Example 5 were used in the inter-color bleed study for comparison. Printing sequences included 1) Printing the B2 black ink first followed by printing the yellow ink later (KY sequence) with subsequent microwave heating, and 2) Printing the Y1 yellow ink first followed by printing the B2 black ink later (YK sequence) with subsequent microwave heating. The average intercolor bleed MFLEN data (on 16 papers) for KY sequence and YK sequence are 39.3 (better than 59.7 as shown in Example 5) and 50 respectively. Better results were obtained with other ink pairs. Lower average inter-color bleed MFLEN data means better print quality. The B2 black ink was also printed in a single pass mode (including 100%, 150%, and 200% solid area coverages) on an ink jet transparency followed by microwave heating to give uniform solid black images without mottle. On the other hand, under the same condition the B1 black ink produced non-uniform (with mottle) solid black image on the ink jet transparency.

The B2 black ink was also examined for ink latency. The latency was determined by jetting the black ink (either B1 or B2) in a 600 spi printhead. The maximum idling time that still allows a printhead to function properly with a transit time of equal to or less than 80 microseconds for an ink to travel a distance of 0.5 mm after a period of non-use or idling is referred to here as the latency or decap time. The maximum idling time the first drop of ink still can be jetted properly is called first drop latency. The maximum idling time the ninth drop of ink (after firing 8 drops of ink) still can be jetted properly is called ninth drop latency. This test is run with the printhead or nozzles uncovered or decapped and generally at a relative humidity (RH) of 15%. The time interval is the longest length of time that the printhead, uncovered, will still fire a specific drop without failure. The longer the latency time rating, the more desirable is the ink for use in an ink jet printer. In general, high resolution printhead (resolution ≧300 spi, for example 400 spi, 600 spi, 720 spi, 800 spi, 1200 spi, etc.) will give a shorter latency for an ink than low resolution printhead due to smaller printhead nozzle opening. The latency data of the black ink (B2) of the present invention is 30–40 sec. (first drop latency) and >500 sec. (ninth drop latency). The ink was jetted smoothly with a very low jitter (0.3). The drop mass was 16–18 ng/drop. The frequency response of the ink of the present invention is >12 KHz which is better than that of the B1 black ink. Faster frequency response allows an ink to be jetted properly at a faster printing speed. The example demonstrates the ink jet ink of the present invention can be employed for high speed ink jet printing.

Equivalents

Those skilled in the art will recognize, or be able to ascertain using no more than routine experimentation, numerous equivalents to the specific procedures described herein. Such equivalents are considered to be within the scope of the present invention and are covered by the following claims. The contents of all references, issued patents, and published patent applications cited throughout this application are hereby incorporated by reference. The appropriate components, processes, and methods of those patents, applications and other documents may be selected for the present invention and embodiments thereof.

What is claimed is:

1. An ink jet ink composition comprising water, a colorant, and at least one water-soluble or ink-compatible anti-intercolor bleed agent containing at least one fluorine atom, wherein said anti-intercolor bleed agent is of the formula:

 (I)

wherein a) ($R_f$) is a $C_1$ to $C_7$ perfluoroalkyl group;

b) (G) is a $C_3$ to $C_{20}$ saturated cycloalkyl group;

c) (A) is an acid finctional group, or a water compatible group selected from the group consisting of ethyleneoxide, propyleneoxide, polyethyleneoxide, polypropyleneoxide and poly(ethylene)oxide-co-propyleneoxide;

d) (X) is a monovalent or multivalent metal cation, or an ammonium group of the general formula:

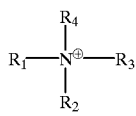 (II)

wherein $R_1$, $R_2$, $R_3$, and $R_4$ are hydrogen, alkyl, hydroxyalkyl, or cycloalkyl, or any of $R_1$, $R_2$, $R_3$, or $R_4$ may form a cyclic alkyl group with another of $R_1$, $R_2$, $R_3$, or $R_4$, and hydroxyalkyl groups; or a hydrogen, amine, hydroxyl, or alkoxyl group when (A) is a water compatible group; and e) m is a number in the range of about 1 to 10, b is 0 or 1, n is 1 or 2, s is 1 or 2, and p is 1 or 2.

2. The ink jet ink composition of claim 1, further comprising a humectant selected from the group consisting of glycols selected from the group consisting of ethylene glycol, propylene glycol, diethylene glycol, dipropylene glycol, triethyleneglycol, tetraethyleneglycol, pentaethyleneglycol, polyethyleneglycol, tripropyleneglycol, tetrapropyleneglycol, and polypropylene glycol; diols selected from the group consisting of 1,3-propanediol, 1,4-butanediol, 1,5-pentanediol, and 1,6-hexanediol; triols selected from the group consisting of glycerine, trimethylolpropane, 1,3,5-pentanetriols, 1,3,5-hexanetriols, 1,2,5-pentanetriols and 1,2,5-hexanetriols; reaction products of all aforementioned glycols, diols, and triols with alkylethyleneoxides selected from the group consisting of ethyleneoxide, propyleneoxide, and mixtures thereof; sulfoxides selected from the group consisting of dimethylsulfoxide, methylethylsulfoxide, and diethylsulfoxide; sulfones selected from the group consisting of sulfolane, methylsulfone, and dimethylsulfone; amides selected from the group consisting of 2-pyrrolidinone, N-methylpyrrolidinone, N,N-dimethylformamide, N-methylacetamide, N,N-dimethylacetamide, and caprolactam; N-hydroxyamides selected from the group consisting of N-acetylethanolamine, N-acetylpropanolamine, and N-hydroxyethylpyrrolidinone; ureas; inner salts consisting of betaines; glycol ethers selected from the group consisting of butylcarbitol and cellusolve; polyglycolethers; alcohols selected from the group consisting of n-hexanol, n-petanol, n-butanol, n-propanol, isopropanol, ethanol, and methanol; thio compounds of the aforementioned hydroxyl containing compounds; amino alcohols; and mixtures thereof.

3. The ink jet ink composition of claim 1, further comprising an additive selected from the group consisting of pH buffering agents, chelating agents, water soluble polymers, anti-clogging agents, anti-curling agents, anti-bleed agents, anti-cockle agents, penetrants, and microwave couplers.

4. The ink jet ink composition of claim 1, wherein said water-soluble or ink-compatible anti-intercolor bleed agent is present in an effective amount to prevent or reduce inter-color bleed or smear, to a concentration of up to about 5% by weight of the ink jet ink composition.

5. The ink jet ink composition of claim 1, wherein said water-soluble or ink-compatible anti-intercolor bleed agent is present in an effective amount to prevent or reduce inter-color bleed or smear, to a concentration of less than 2% by weight of the ink jet ink composition.

6. An ink jet printing process comprising imagewise printing an ink jet ink composition of claim 3, wherein said ink jet ink composition is a first ink having a surface tension of less than 45 dynes/cm, said ink jet composition printed on an optionally heated substrate next to a second ink that has a sharp edge acuity.

7. The ink jet printing process of claim 6, wherein said second ink has a surface tension of $\geq 45$ dynes/cm.

8. The ink jet printing process of claim 6, wherein said first ink and said second inks are dye- or pigmented-based inks and are independently black inks or color inks.

9. The ink jet printing process of claim 6 using at least one ink jet ink comprising a pigment that is either chemically modified or stabilized by a pigment dispersant selected from the group consisting of anionic, cationic, and nonionic dispersants, as well as mixtures thereof.

10. The ink jet printing process of claim 9, wherein said pigment is a chemically modified carbon black comprising anionic carboxylic acid salts, phosphonic acid salts, sulfonic acid salts or cationic ammonium groups.

11. A multi-color ink jet printing process comprising 1) printing a first ink jet ink composition of claim 1 onto an optionally heated substrate, 2) printing a second ink jet ink composition of a different color onto said optionally heated substrate next to said first ink, 3) printing additional ink jet ink compositions of differing color from said first and second inks onto said optionally heated substrate at any stage of the multi-color ink jet printing process, and 4) carrying out said printing in an image-wise fashion according to digital data signals in any desired printing sequence or order at a speed up to 50 copies per minute of multi-color images.

12. The multi-color ink jet printing process of claim 11 wherein said multi-color ink jet printing process is carried out by a single pass or a multiple pass ink jet printing method.

13. The multi-color ink jet printing process of claim 12, wherein said multi-color ink jet printing process is conducted by ink jet printheads independently selected from the group consisting of a single printhead, a partial-width printhead and a full-width array printhead.

14. The multi-color ink jet printing process of claim 13, wherein at least one of said ink jet printheads has a resolution which is equal to or greater than 300 spi.

15. The multi-color ink jet printing process of claim 13, wherein at least one of said ink jet printheads has a resolution which is equal to or greater than 600 spi.

16. A multi-color ink jet printing process comprising deposition of at least cyan, magenta, yellow, and black ink jet ink compositions by their corresponding printheads in any desired printing method and sequence according to digital data signals onto a print substrate, wherein said set of four or more ink jet ink compositions comprises at least one ink jet ink composition according to claim 1.

17. The multi-color ink jet printing process of claim 16, wherein said printheads are independently selected from the group consisting of a single printhead, partial-width printhead, and full-width array printhead, and said multi-color ink jet printing process is operated at speeds of up to 50 pages per minute.

18. The multi-color ink jet printing process of claim 16, wherein said print substrate is heated at any stage of said ink jet printing process.

19. The multi-color ink jet printing process of claim 18, wherein said heating is via a heating device selected from the group consisting of a radiant heater, a heated roller, a heated platen, a heated drum, a heated belt, a microwave drying device, a heated lamp, hot air, and combinations thereof.

20. The multi-color ink jet ink printing process of claim 16, wherein said multi-color ink jet ink printing process is selected from the group consisting of continuous ink jet printing and drop-on-demand ink jet printing.

21. The multi-color ink jet printing process of claim 17, wherein at least one of said printheads has a resolution $\geq 600$ spi.

22. A multi-color ink jet printing process employing an ink jet ink composition of claim 1 and having a latency of $\geq 10$ sec. when said ink is printed with a printhead with a resolution of $\geq 600$ spi.

23. A multi-color ink jet printing process employing an inkjet ink composition of claim 1 having a frequency response of up to 12 kHz when a printhead with a resolution of $\geq 600$ spi is used.

24. The multi-color ink jet printing process of claim 16, wherein said sequence is selected from the group consisting of a) K, C, M, Y; b) K, C, Y, M; c) K, M, C, Y; d) K, M, Y, C; e) K, Y, C, M; f) K, Y, M, C; g) Y, C, M, K; h) Y, M, C, K; i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; w) M, C, K, Y; x) M, K, Y, C; and z) M, K, C, Y.

25. The multi-color ink jet printing process of claim 16, wherein said sequence is selected from the group consisting of a); c); g); and h).

26. The multi-color ink jet printing process of claim 16, wherein said set of four or more ink jet ink compositions is independently selected from the group consisting of color dye based ink, black dye based ink, color pigmented-based inks, and black pigmented-based inks.

27. The multi-color ink jet printing process of claim 26, wherein at least one ink jet ink composition comprises a pigment that has been either chemically modified or stabilized by a pigment dispersant selected from the group consisting of anionic, cationic, and nonionic dispersants, and mixtures thereof.

28. The multi-color ink jet printing process of claim 27, wherein said pigment comprises pigment particles that are chemically modified with the attachment of at least one functional group selected from the group consisting of carboxylic acid salts, sulfonic acid salts, phosphonic acid salts, and ammonium salts.

29. The multi-color ink jet printing process of claim 26, wherein said dye-based inks comprise dyes independently selected from the group consisting of anionic, cationic, acid, direct, disperse, and reactive dyes, and mixtures thereof.

30. The ink jet ink composition of claim 2, wherein said anti-intercolor bleed agent is a monovalent or divalent metal salt selected from the group consisting of hexylsulfonic acid undecafluoro- salts; heptylsulfonic acid tridecafluoro- salts; octylsulfonic acid pentadecafluoro- salts; nonylsulfonic acid heptadecafluoro- salts; hexylsulfonic acid tridecafluoro- salts; heptylsulfonic acid pentadecafluoro- salts; octylsulfonic acid octadecafluoro- salts; nonylsulfonic acid nonadecafluoro- salts; perfluoro-1-octanesulfonic acid salts; perfluoro-1-nonanesulfonic acid salts; perfluoro-1-decanesulfonic acid salts; perfluoro-1-dodecanesulfonic acid salts; cyclohexanesulfonic acid decafluoro (pentafluoroethyl)-salts; cyclohexanesulfonic acid nonafluorobis(trifluoromethyl)- salts; cyclohexanesulfonic acid decafluoro(trifluoromethyl)-, salts; perfluorocyclohexanesulfonic acid salts; hexylphenylsulfonic acid tridecafluoro-salts; heptylphenylsulfonic acid pentadecafluoro- salts; octylphenylsulfonic acid heptadecafluoro- salts; nonylphenylsulfonic acid nonadecafluoro- salts; pentafluoropropionic acid salts; perfluorobutyric acid salts; perfluoropentanoic acid salts; undecafluorohexanoic acid salts; perfluoroheptanoic acid salts; dodecafluoroheptanoic acid salts; undecafluorohexanoic acid esters of polyethyleneglycol; undecafluorohexanoic acid esters of poly(ethyleneoxide-co-propyleneoxide); undecafluorohexanoic acid esters of polypropyleneglycol; decafluorohexanoic acid salts; tridecafluoroheptanoic acid salts; didecafluoroheptanoic acid salts; pentadecafluorooctanoic acid salts; heptadecafluorononanoic acid salts; perfluoromethyldecanoic acid salts; perfluoroethyldecanoic acid salts; perfluorotetradecanoic acid salts; perfluoromethyltetradecanoic acid salts; cyclohexanecarboxylic acid decafluoro(pentafluoroethyl)-, salts; cycloheptanecarboxylic acid nonafluorobis(trifluoromethyl)-, salts; cyclohexanecarboxylic acid decafluoro(trifluoromethyl)-, salts; perfluoromethylcyclohexanecarboxylic acid salts; hexyltetrafluorobenzoic acid salts; heptyltetrafluorobenzoic acid salts; perfluorohexyltetrafluorobenzoic acid salts; perfluoromethyltetrafluorobenzoic acid esters of polyethyleneglycol; hexylbenzoic acid, tridecafluoro- salts; heptylbenzoic acid pentadecafluoro- salts; perfluoropentylbenzoic acid salts; perfluorohexylbenzoic acid salts; perfluoroheptylbenzoic acid salts; octylbenzoic acid, heptadecafluoro-salts; nonylbenzoic acid, nonadecafluoro- salts; perfluorohexylnaphthoic acid 2-(hydroxyethyl)ammonium salt; perfluoromethylnaphthoic acid salts; tridecafluorohexylnaphthoic acid salts; pentadecafluoroheptylnaphthoic acid salts; tridecafluorohexylnaphthoic acid salts; perfluorobutylnaphthoic acid salts; perfluoropropylnaphthoic acid salts; perfluorohexylnaphthoic acid salts; and perfluoroheptylmethylnaphthoic acid salts; and mixtures thereof.

31. The ink jet ink composition of claim 2 comprising a water-soluble or ink-compatible anti-intercolor bleed agent of Formula (I) which is an ammonium salt of an acid selected from the group consisting of hexylsulfonic acid undecafluoro- salt; heptylsulfonic acid tridecafluoro- salt; octylsulfonic acid pentadecafluoro- salt; nonylsulfonic acid heptadecafluoro- salt; hexylsulfonic acid tridecafluoro- salt; heptylsulfonic acid pentadecafluoro- salt; octylsulfonic acid octadecafluoro- salt; nonylsulfonic acid nonadecafluoro- salt; perfluoro-1-octanesulfonic acid salt, perfluoro-1-nonanesulfonic acid salt, perfluoro-1-decanesulfonic acid salt, perfluoro-1-dodecanesulfonic acid salt, cyclohexanesulfonic acid decafluoro(pentafluoroethyl)-, salt; cyclohexanesulfonic acid nonafluorobis(trifluoromethyl)- salt; cyclohexanesulfonic acid decafluoro(trifluoromethyl)- salt; perfluorocyclohexanesulfonic acid salt hexylphenylsulfonic acid tridecafluoro- salt; heptylphenylsulfonic acid pentadecafluoro- salt; octylphenylsulfonic acid heptadecafluoro- salt; nonylphenylsulfonic acid nonadecafluoro- salt; pentafluoropropionic acid salt; perfluorobutyric acid salt; perfluoropentanoic acid salt; undecafluorohexanoic acid salt; perfluoroheptanoic acid salt; dodecafluoroheptanoic acid salt; decafluorohexanoic acid salt; tridecafluoroheptanoic acid salt; didecafluoroheptanoic acid salt; pentadecafluorooctanoic acid, salt; heptadecafluorononanoic acid, salt; perfluoromethyldecanoic acid salt; perfluoroethyldecanoic acid salt; perfluorotetradecanoic acid salt; perfluoromethyltetradecanoic acid salt; cyclohexanecarboxylic acid decafluoro(pentafluoroethyl)- salt; cycloheptanecarboxylic acid, nonafluorobis(trifluoromethyl)- salt; cyclohexanecarboxylic acid decafluoro(trifluoromethyl)- salt; perfluoromethylcyclohexanecarboxylic acid salt; hexyltetrafluorobenzoic acid salt; heptyltetrafluorobenzoic acid salts; perfluorohexyltetrafluorobenzoic acid salt; hexylbenzoic acid tridecafluoro- salt; heptylbenzoic acid pentadecafluoro- salt; perfluoropentylbenzoic acid salt; perfluorohexylbenzoic acid salt; perfluoroheptylbenzoic acid salt; octylbenzoic acid heptadecafluoro- salt; nonylbenzoic acid nonadecafluoro- salt; perfluorohexylnaphthoic acid 2-(hydroxyethyl)ammonium salt; perfluoromethylnaphthoic acid salt; tridecafluorohexylnaphthoic acid salt; pentadecafluoroheptylnaphthoic acid salt; tridecafluorohexylnaphthoic acid salt; perfluorobutylnaphthoic acid salt; perfluoropropylnaphthoic acid salt; perfluorohexylnaphthoic acid salt; and perfluoroheptylmethylnaphthoic acid salt; and mixtures thereof.

32. The ink composition of claim 1, further comprising a second anti-intercolor bleed agent of Formula I different from said first anti-intercolor bleed agent.

33. The ink composition of claim 1, further comprising a third anti-intercolor bleed agent of Formula I different from said first or second anti-intercolor bleed agents.

34. The multi-color ink jet ink printing process of claim 20, wherein said drop-on-demand ink jet printing process is selected from the group consisting of thermal, piezoelectric, and acoustic ink jet printing.

* * * * *